Figure 1:
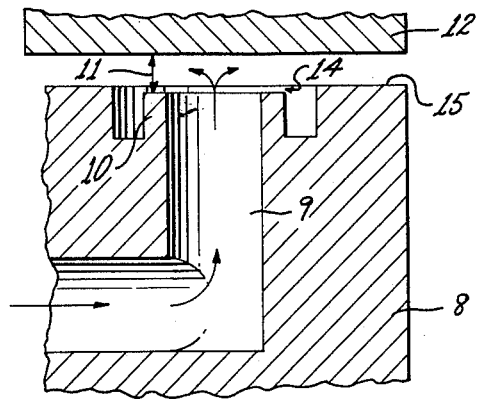

Sept. 29, 1964  J. H. STRAW ETAL  3,150,442

METHOD OF MAKING A NOZZLE

Filed March 12, 1963

INVENTORS
JESSE H. STRAW
WILLIS FAY ALLER

BY

THEIR ATTORNEY

United States Patent Office 3,150,442
Patented Sept. 29, 1964

3,150,442
METHOD OF MAKING A NOZZLE
Jesse H. Straw and Willis Fay Aller, Dayton, Ohio, assignors to The Sheffield Corporation, Dayton, Ohio, a corporation of Delaware
Filed Mar. 12, 1963, Ser. No. 264,608
6 Claims. (Cl. 29—157)

This invention relates to a method for making fluid exhaust nozzles and more particularly to a method for making nozzles for use as sensing elements in precision fluid type dimensional measuring systems.

For many years the gaging industry has used fluid jets or nozzles in various gaging circuits for measuring or checking physical characteristics, such as dimensions, of a workpiece. Generally such measuring nozzles or jets are included as a sensing element in pneumatic measuring circuits wherein flow or pressure changes reflecting the workpiece dimension, for example, are obtained in the circuit as determined by the proximity of the workpiece or other flow controlling surface to the nozzle or jet outlet. The configuration of such nozzles or jets is critical in obtaining precision gaging results, including such factors as linearity of response, and balance in multiple jet configurations. It is generally known that better gaging performance and better linearity over a greater dimensional displacement between the outlet of a gaging jet and the workpiece can be obtained by providing a relatively large volume supply passage which communicates as closely as possible with a shaped orifice which restricts the passage to a smaller size at its outlet as required for a given gaging application.

Attempts in the past to obtain this optimum configuration have proven generally deficient because of difficulties in manufacture and application, as well as excessive cost in manufacture. For example, one previous attempt at accomplishing this has been to provide a large volume air passage in the gaging element and then install as a separate element the correct size and shape orifice or nozzle therein at the gage head surface.

The manufacture and assembly of the nozzle as a separate element is expensive, and furthermore, because of the precision requirements of all elements in such systems, the various techniques for installing and holding an insert in place have not been entirely satisfactory. Further problems have been created where such inserts have worked loose with usage. Attempts to internally machine relatively large supply passages leading to restricted outlets in these systems are severely limited and impractical because in almost all applications the nozzle zone is inaccessible from the upstream or supply side.

Accordingly it is an object of this invention to overcome the deficiencies of prior methods of manufacture and provide a method of making such nozzles or jets to optimum configurations in a more economical and practical manner.

It is a further object of this invention to provide a method for making a fluid exhaust nozzle, particularly for applications as discussed above, as an integral part of a gage head blank by working from the outlet end portion of a supply passage therein of relatively large flow area to form the blank into a restricted nozzle configuration of a selected size.

Another object of this invention is to provide a method for making such nozzle outlets as an integral portion of a nozzle blank by forming a projection in the surface of the blank surrounding a supply passage outlet and, in a single operation, deforming said projection radially inward against an inner limiting stop by means of a forming tool having the desired configuration.

Figure 2:
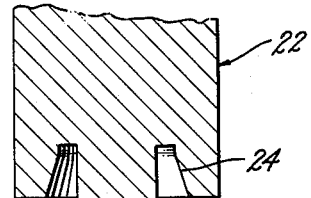
Figure 2:
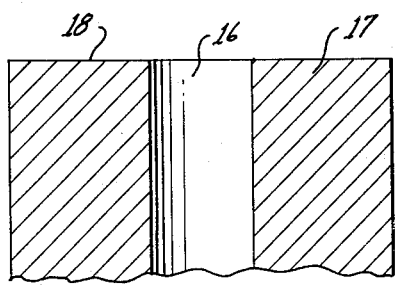
Figure 4:
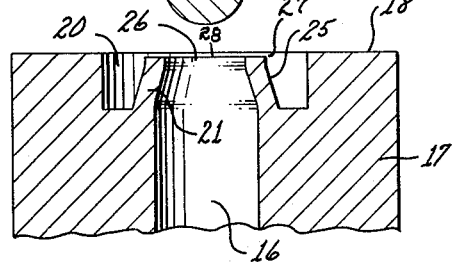
Figure 3:
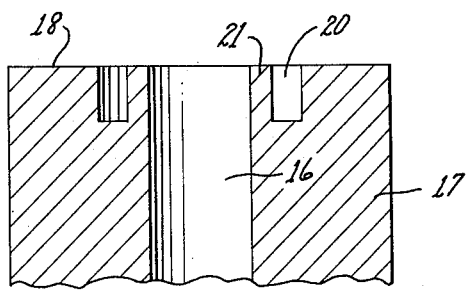

Other objects and advantages of the invention will be apparent from the following description, the appended claims, and the accompanying drawings, in which, FIG. 1 illustrates, as an exemplary application, an enlarged cross sectional view of a standard jet or nozzle in gaging relation with a workpiece, and FIGS. 2, 3, and 4 illustrate steps of the present method in an exemplary application.

For purposes of illustration a standard fluid gage jet, orifice or nozzle, for example an air jet 10, is shown in enlarged cross section in FIG. 1 as a part of nozzle blank 8. During gaging, air flow from a pneumatic gaging system, not shown, and through supply passage 9 is determined not only by the internal diameter of the jet but also by the size of the restriction at 11 formed by the relative displacement of a workpiece 12 from the jet exit or outlet. The outlet of jet 10 is depressed below the outer surface 15 of blank 8 as indicated at 14 for purposes well known in the art. In this illustration of prior conventional practice, supply passage 9 is of uniform diameter to its outer exhausting terminus. As discussed earlier, to provide for better performance during air gaging it is desirable to provide a supply passage of relatively large volume and to incorporate a correctly sized and shaped relatively restricted orifice in the passage as close as possible to the gage head surface and as an integral part of the passage outlet. This desired configuration is not accomplished in the example of FIG. 1.

The present invention provides a method for making a nozzle which includes a properly sized and shaped orifice as by swaging from the outlet end of the nozzle. As illustrated in FIG. 2, a hole or supply passage 16 is formed in a blank 17 of suitable rigid material to be used for a gage head, for example; hole 16 terminating at the outer surface 18 thereof. This hole is formed by any suitable method and is preferably drilled cylindrically because of economy of manufacture. A suitable fluid escape groove, such as an annular groove 20, shown in FIG. 3, is formed in the outer surface of the material surrounding the hole 16 as by cutting or milling. Cutting the annular groove leaves a wall or projection 21 of material of generally uniform thickness between the groove and the hole and extending along a limited outer length of passage 16.

Under the present invention the projection 21 is then deformed inward to a proper size and shape to form a nozzle or jet of the desired configuration by the application of a force thereagainst. An impact force applied generally axially along the axis of the hole and which has components directed radially toward the axis of the hole is used to deform and compress projection 21 against an inner mechanical stop to thereby restrict the outlet diameter of the hole or passage 16 to a smaller diameter to form a nozzle having the desired internal and external configuration as an integral part of blank 17.

This step of the method is illustrated particularly in FIG. 4 wherein an exemplary tool 22 has a projection at 23 of smaller transverse dimension than that of passage 16 for insertion into passage 16 to determine the restricted outlet dimension and configuration at 26 during forming. The tool has an annular forming surface 24 thereon for engaging the outside of projection 21 and forcing its outer outlet end radially inward while determining the nozzle configuration. During the forming process an axially directed swaging force is applied, relatively between blank 17 and tool 22, such as by impacting, so that the tool engages the projection 21 and compresses the outer surface of projection 21 radially inward to the configuration as indicated at 25, corresponding to the surface 24 of tool 22, while simultaneously projection or rod portion 23 limits and shapes the terminal outer end of the nozzle passage to the restricted size shown at 26 and preferably with a limited terminus portion as shown, parallel to the axis of hole 16.

While the swaging operation will normally cause some depression of land 28 in projection 21, in some instances a finish grind or other operation may be applied to secure a depression 27 of desired precision below the outer surface of blank 17.

Thus it is seen that a method is provided which enables, by the application of forces from the outlet end of a supply passage terminating in an outer surface of a blank, the economical forming of a nozzle as an integral part of the blank and with a configuration providing improved performance.

While the method herein described and the tooling configuration referred to herein constitute preferred embodiments of the invention it is to be understood that the invention is not limited to the precise method or form of tooling and that changes may be made therein without departing from the scope of the invention which is defined in the appended claims.

What is claimed is:

1. A method for making a restricted outlet nozzle for the discharge of fluid comprising,
    forming a fluid passage in a rigid material terminating at an outer surface thereof,
    forming a groove in the outer surface of said material immediately surrounding the outer end portion of said passage to leave a projection in the material between said groove and said outer passage end,
    and deforming said projection radially inward to restrict the size of the portion of said passage within said projection to thereby form a nozzle.

2. A method for making a restricted outlet nozzle for the discharge of fluid comprising,
    forming a cylindrical hole in a nozzle blank terminating at an outer surface thereof,
    forming an annular groove in the outer surface of said blank immediately adjacent to said hole and concentric therewith to leave a cylindrical projection of material extending between said groove and said hole and along a fractional outer part of said hole,
    and deforming said projection radially inward by application of a tool having a configuration to restrict said projection into a nozzle having a reduced exit area.

3. A method for making a restricted outlet nozzle for the discharge of a gaging fluid comprising,
    cutting a generally cylindrical hole into a rigid body terminating at an outer surface thereof,
    cutting an annular groove in the outer surface of said body surrounding the outer end portion of said hole and concentric therewith to leave a wall in the body between said groove and said hole,
    and forming said wall from the outlet end of said hole with a force having components directed generally toward the axis of said hole to thereby restrict said hole, while limiting the extent of restriction of the projection to size the nozzle.

4. A method for making a restricted outlet nozzle for an air gage comprising,
    cutting an air supply hole in a gage head terminating in an outer surface thereof,
    cutting a groove in the outer surface of the head immediately surrounding said hole, said groove being generally symmetrical with said hole and leaving a generally uniform wall of material along the outer end portion of said hole between said groove and said hole,
    and impacting said wall inward against a mechanical stop within said hole to compress the outside of said wall into a generally convex shape and the inner portion thereof into a nozzle having an outlet cross sectional area smaller than the cross sectional area of said hole.

5. A method for making a restricted discharge nozzle in an air gage head for use in dimensional measurements comprising,
    cutting an air supply passage in the gage head terminating at an outer surface thereof,
    cutting a groove in the outer surface of the head immediately surrounding the discharge end of the passage to leave a projection of material extending between said groove and the passage and along an outer portion of the passage,
    inserting a tool having a transverse dimension smaller than the corresponding dimension of the passage into the outer end thereof,
    and applying an axially and radially directed compression force against said projection from the outer end of the passage to compress said projection against said tool and thereby limit the internal dimension of the nozzle to that of said tool while depressing the outermost surface of said projection below the outer surface of said head in a plane perpendicular to the axis of said passage.

6. A method for integrally forming a restricted discharge nozzle in an air gage head for use in dimensional measurements comprising,
    cutting a generally cylindrical air supply hole into the head terminating at an outer surface thereof,
    cutting an annular groove of limited depth in the outer surface of said head immediately surrounding said hole and concentric therewith, thereby leaving a projection of material between the groove and the outer end portion of said hole,
    applying a forming tool to said head by insetring a rod portion thereof of a smaller diameter than the hole into said hole and engaging an annular concave swaging portion thereof against the outside end portion of said projection,
    and relatively impacting said tool and head with a force applied generally parallel to the axis of the hole to thereby swage the outer end of said projection against said rod portion to restrict the outlet diameter of the hole into a desired nozzle configuration.

References Cited in the file of this patent
UNITED STATES PATENTS

| | | |
|---|---|---|
| 1,284,914 | Leitch | Nov. 12, 1918 |
| 2,121,035 | Hollister | June 21, 1938 |